United States Patent
Debert et al.

(10) Patent No.: US 9,796,370 B2
(45) Date of Patent: *Oct. 24, 2017

(54) METHOD AND DEVICE FOR CONTROLLING AN ENERGY EQUIVALENCE FACTOR IN A HYBRID MOTOR PROPULSION PLANT

(71) Applicant: RENAULT s.a.s., Boulogne-Billancourt (FR)

(72) Inventors: Maxime Debert, Versailles (FR); Yann Chamaillard, Le Bardon (FR); Guillaume Colin, Olivet (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/780,231

(22) PCT Filed: Mar. 29, 2013

(86) PCT No.: PCT/FR2013/050708
§ 371 (c)(1),
(2) Date: Sep. 25, 2015

(87) PCT Pub. No.: WO2014/154951
PCT Pub. Date: Oct. 2, 2014

(65) Prior Publication Data
US 2016/0052507 A1 Feb. 25, 2016

(51) Int. Cl.
*B60W 10/06* (2006.01)
*B60W 10/26* (2006.01)
(Continued)

(52) U.S. Cl.
CPC .......... *B60W 10/06* (2013.01); *B60W 10/08* (2013.01); *B60W 10/26* (2013.01); *B60W 20/00* (2013.01);
(Continued)

(58) Field of Classification Search
CPC ...... B60W 10/06; B60W 20/00; B60W 10/08; B60W 2550/00; B60W 2510/244; Y02T 10/6286; Y02T 10/56
See application file for complete search history.

(56) References Cited

U.S. PATENT DOCUMENTS 8,874,295 B2 * 10/2014 Terakawa .............. B60W 10/02
180/65.265
8,882,634 B2 * 11/2014 Banker ............... B60W 10/196
477/5
(Continued)

FOREIGN PATENT DOCUMENTS

FR 2 988 674 A1 10/2013

OTHER PUBLICATIONS

International Search Report issued Nov. 25, 2013, in PCT/FR2013/050708 filed Mar. 29, 2013.

*Primary Examiner* — Frederick Brushaber
(74) *Attorney, Agent, or Firm* — Oblon, McClelland, Maier & Neustadt, L.L.P.

(57) ABSTRACT

A method of determining an equivalence energy factor representing weighting applied between an infeed of energy of thermal origin and an infeed of energy of electrical origin, to minimize on an operating point overall energy consumption of a hybrid motor propulsion plant for an automotive vehicle including a heat engine and at least one electric motor powered by a battery. This factor is controlled in a discrete manner as a function of an instantaneous state of energy of the battery, and of an energy target, and as a function of the vehicle running conditions.

8 Claims, 1 Drawing Sheet

(51) Int. Cl.
  *B60W 20/00* (2016.01)
  *B60W 10/08* (2006.01)
  *B60W 50/00* (2006.01)
  *B60W 20/13* (2016.01)

(52) U.S. Cl.
  CPC ....... *B60W 20/13* (2016.01); *B60W 2050/001* (2013.01); *B60W 2510/244* (2013.01); *B60W 2550/00* (2013.01); *B60W 2710/244* (2013.01); *Y02T 10/56* (2013.01); *Y02T 10/6286* (2013.01)

(56) References Cited

U.S. PATENT DOCUMENTS

| | | | | |
|---|---|---|---|---|
| 9,174,636 B2* | 11/2015 | Debert | ................ | B60W 10/06 |
| 2002/0107618 A1* | 8/2002 | Deguchi | ............... | B60W 20/12 |
| | | | | 701/22 |
| 2008/0319597 A1* | 12/2008 | Yamada | ................ | B60K 6/46 |
| | | | | 701/22 |
| 2010/0179714 A1* | 7/2010 | Tani | ..................... | B60W 20/12 |
| | | | | 701/22 |
| 2011/0066308 A1* | 3/2011 | Yang | .................... | B60W 20/12 |
| | | | | 701/22 |
| 2012/0032637 A1* | 2/2012 | Kotooka | ................. | B60K 6/46 |
| | | | | 320/109 |
| 2012/0208672 A1* | 8/2012 | Sujan | ................... | B60W 10/02 |
| | | | | 477/5 |
| 2013/0073113 A1* | 3/2013 | Wang | .................... | B60K 6/445 |
| | | | | 701/1 |
| 2013/0197712 A1* | 8/2013 | Matsuura | ............... | B60R 25/24 |
| | | | | 701/1 |
| 2014/0229048 A1* | 8/2014 | Kawata | ................... | B60K 6/48 |
| | | | | 701/22 |
| 2015/0149011 A1* | 5/2015 | Debert | ................. | B60W 20/14 |
| | | | | 701/22 |
| 2015/0275787 A1* | 10/2015 | Dufford | ................ | F02D 29/02 |
| | | | | 701/102 |
| 2015/0275788 A1* | 10/2015 | Dufford | ................ | F02D 29/02 |
| | | | | 701/102 |
| 2016/0243947 A1* | 8/2016 | Perkins | .................. | B60L 1/003 |

\* cited by examiner

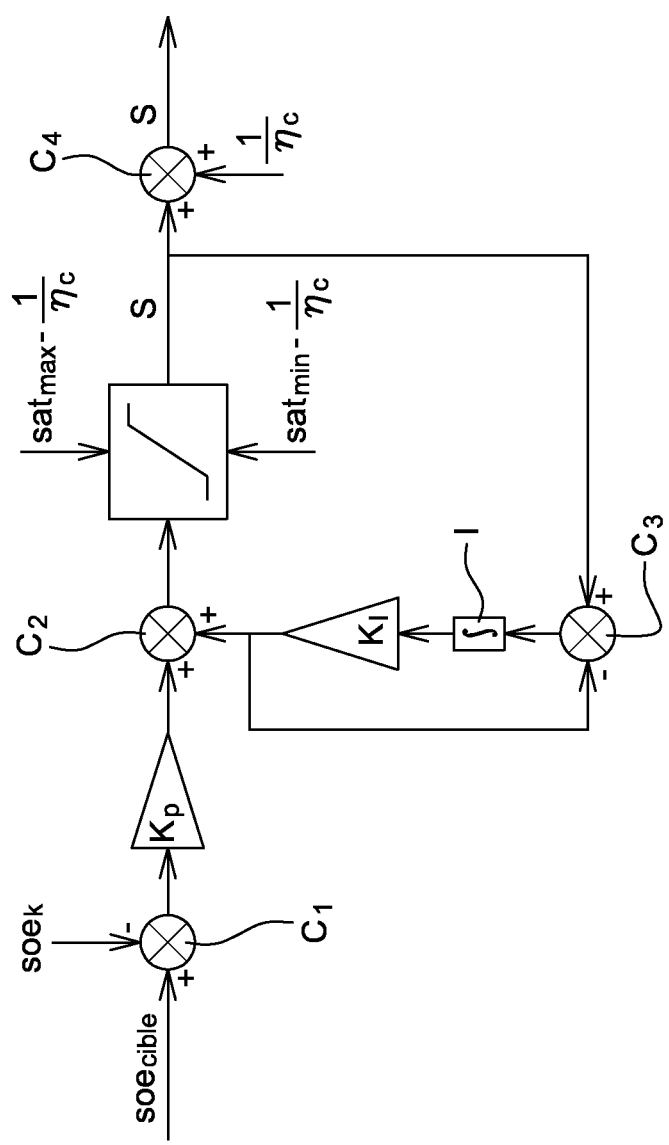

METHOD AND DEVICE FOR CONTROLLING AN ENERGY EQUIVALENCE FACTOR IN A HYBRID MOTOR PROPULSION PLANT

The present invention relates to the management of the distribution of energy fluxes in a hybrid motor propulsion plant for a motor vehicle.

More precisely, the present invention relates to the determination of an energy equivalence factor representing the weighting applied between the infeed of energy of thermal origin and the infeed of energy of electrical origin, so as to minimize at an operating point the overall energy consumption of a hybrid motor propulsion plant for a motor vehicle, of the type comprising a heat engine and at least one electric motor powered by a battery.

A motor propulsion plant for a motor vehicle with hybrid propulsion or traction comprises a heat engine and one or more electric machines, powered by at least one battery installed on board the vehicle.

The systems for controlling hybrid motor propulsion plants have been designed to manage the operation and the synchronization of the different motors on the basis of running conditions so as to limit the fuel consumption and so as to minimize the emissions of polluting particles. Reference is made to the management of thermal and electrical energy fluxes in order to designate, in particular, the control strategy implemented in the control system with a view to optimizing the distribution of power between the fluxes of thermal energy and the fluxes of electrical energy. The principle implemented in order to select the best operating point consists of minimizing the sum of the thermal consumption and of the electrical consumption by weighting the energy of electrical origin by a weighting or equivalence factor.

This factor weights the electrical energy with the thermal energy, i.e. it gives the quantity of fuel necessary to recharge a certain amount of electrical energy stored in the battery or, conversely, gives the quantity of fuel able to be saved by using a certain quantity of energy originating from the battery. So that the energy management strategy is optimal during a journey, it is necessary for this equivalence factor to be unique and constant for the given running conditions. This factor is dependent on a number of parameters, such as the duration, length in kilometers of the journey, the altitude profile encountered, the driving mode, the ambient conditions (town, suburban zone, motorway, and so on), etc.

Publication FR 2 935 123 discloses a system and a method for controlling a hybrid motor propulsion plant equipped with a module for determining an optimal operating mode and a module for determining the operating point of the motor or motors in the optimal operating mode. The system comprises a weighting means able to influence the consumption of electrical energy and uses a variable weighting coefficient in a manner inversely proportional to the state of charge of the battery with a view to increasing the weighting value when the battery is discharged and to reduce said value when the battery is charged.

In accordance with this method the equivalence factor, or weighting factor, is linearly dependent on the state of charge of the battery. When the battery is empty the factor is high, which tends to recharge the battery, and when the battery is full the factor is low, which discharges the battery. The main advantage of this type of control is the assurance of remaining within the usable limits of the battery, i.e. between 0% and 100% of the state of charge or "SOC" of the battery.

However, the disadvantages of this method are as follows:

the difficulty of adapting the equivalence factor on the basis of the environment and of the driver, an underestimation of the total energy use range of the battery, and the absence of consideration of other ambient factors, such as the running conditions.

Publication DE 1 032 3722 also discloses changing the equivalence on the basis of certain running conditions. However, the described method does not make it possible to take into consideration the gradient of the road or the driving style of the driver, nor does it make it possible to use the entire energy range of the battery.

The present invention proposes a control method and device ensuring optimized control of the equivalence factor with a view to coming as close as possible to the optimal solution, taking into account all the influencing factors.

The present invention with this objective proposes controlling the equivalence factor in a discrete manner on the basis of the instantaneous state of energy of the battery, and a target energy depending on the vehicle running conditions and/or predictions regarding the running conditions.

The proposed device in particular comprises an integrator of a term representative of the difference between the instantaneous state of energy of the battery and the target energy state.

Further features and advantages of the present invention will become clear upon reading the following description of a non-limiting embodiment thereof, given with reference to the accompanying drawing, of which the sole FIGURE schematically shows the implemented device.

In this device a first comparator C1 receives, in input values, the state of energy $soe_k$ of the battery at the moment k, and target state of energy value $soe_{target}$. The difference ($soe_{target}-soe_k$) is multiplied by a correction gain $K_p$. A second comparator C2 sums the result [$K_p(soe_{target}-soe_k)$] and a correction term of the integral type, which assures a correction of the equivalence factor on the basis of the encountered running conditions. This sum is saturated by the saturator S, which assures that the equivalence factor will remain within the controlled limits. The minimum saturation ($sat_{min}-1/\eta$) and maximum saturation ($sat_{max}-1/\eta$) limits assure that forced recharge and discharge modes are controlled.

The maximum saturation $sat_{max}$ is the maximum equivalence value assuring a control of the motor propulsion group such that the energy of the battery is recharged to the maximum. The saturation $sat_{min}$ is the minimum equivalence factor assuring a control of the motor propulsion group such that the battery is discharged to the maximum. The integrator I integrates the difference between the output of the saturator S and its own integration multiplied by a correction gain $K_i$ with the aid of the comparator C3. By integrating this difference, the integrator cannot run out of control when the system is saturated. This method is known by the name "anti-windup" or anti-racing or desaturator. The output of the saturator is added with a term $1/\eta$ of the "feedforward" or pre-positioning term type with the aid of the comparator C4. This "feedforward" or pre-positioning term makes it possible to directly adapt the equivalence factor on the basis of an encountered and/or predicted running situation.

To summarize, the proposed device comprises a loop integrator of a term representative of the difference between the instantaneous state of the energy of the battery and the target energy state of the battery combined with an anti-windup device. It also comprises a proportional compensation term.

The control implemented with this device also has a feedforward term. The equivalence factor is controlled in a discrete manner in accordance with the following equation:

$$S_{k+1}=1/\eta_c+Kp(\text{soe}_{target}-\text{soe}_{k+1})+KpKi(\text{soe}_{target}-\text{soe}_k)$$

In this equation $\text{soe}_{target}$ is the target energy state to be reached and $\text{soe}_k$ is the energy state of the battery at the moment k. $K_p$ and $K_i$ are, respectively, the proportional and integral correction gains; ηc is the mean yield of conversion of the electrical energy into thermal energy. The mean yield of conversion ηc may thus be calculated in order to adapt permanently to the circumstances on the basis of the knowledge a priori of foreseeable running conditions or on the basis of analysis of the previous running conditions. The integral correction provides a correction a posteriori of energy equivalence hypotheses.

If, for example, a type of running "in congestion" is identified, it is possible to provide the conversion yield $\eta_c$ with a value suitable for situations of congestion and to obtain an equivalence factor substantially different from the equivalence factor on a motorway.

In addition, the desired target energy $\text{soe}_{target}$ can be defined on the basis of the running conditions. If the vehicle has a navigation system, it is then possible to utilize the information provided thereby in order to optimize the target.

Lastly, when the equivalence is saturated, i.e. the equivalence factor s reaches limit values, imposing a recharge or a discharge of the battery at all costs, the equivalence factor s does not exceed acceptable limits (lower and upper) because the anti-windup avoids any untimely runaway of the integral term.

In conclusion, the invention makes it possible:
- to use the energy contained in the battery more suitably and to draw all possible benefits therefrom to reduce consumption,
- to take into account the environment and the driver,
- to take into account the altitude profile in the event that information is provided via the navigation system, and
- to manage energy fluxes based more on an "energy state" of the battery than on the state of charge thereof, which is more advantageous in terms of consumption.

The invention claimed is:

1. A method for controlling a distribution of power between a heat engine and an electric machine powered by a battery in a hybrid motor propulsion plant for a motor vehicle, the method comprising:
   determining an initial energy equivalence factor representing weighting applied between an infeed of energy of thermal origin from the heat engine and an infeed of energy of electrical origin from the electric machine to minimize at an operating point overall energy consumption of the hybrid motor propulsion plant for a motor vehicle
   based on an energy equivalence hypothesis which considers an instantaneous state of energy of the battery, a target energy, and predicted running conditions of the vehicle;
   controlling a distribution of power between the heat engine and the electric machine based on the initial energy equivalence factor;
   correcting, a posteriori, the energy equivalence hypothesis based on encountered running conditions to provide a corrected energy equivalence factor; and
   controlling a distribution of power between the heat engine and the electric machine based on the corrected energy equivalence factor.

2. The method of claim 1, wherein the target energy is dependent on predictions regarding the running conditions.

3. The method of claim 1, further comprising determining an integrated term of an estimation of a state of energy of the battery.

4. The method of claim 3, wherein the integrated term is dependent on the difference between the target energy and the instantaneous state of energy of the battery.

5. The method of claim 4, wherein calculation of the integrated term is looped by an integral proportional calculation regarding a state of charge of the battery.

6. The method of claim 3, wherein the integrated term is looped by an anti-windup factor.

7. The method of claim 1, being pre-compensated by a term dependent on a conversion yield of the electrical energy into mechanical energy.

8. The method of claim 1, further comprising providing a saturator defining a minimum saturation limit and a maximum saturation limit at which forced recharge and discharge modes occur respectively.

* * * * *